United States Patent [19]
Shin

[11] Patent Number: 5,708,689
[45] Date of Patent: Jan. 13, 1998

[54] CIRCUIT FOR DETECTING A SYNCHRONIZATION BYTE OF A TRANSPORT STREAM

[75] Inventor: Jeong-Cheol Shin, Suwon-si, Rep. of Korea

[73] Assignee: Samsung Electronics Co., Ltd., Kyungki-Do, Rep. of Korea

[21] Appl. No.: 704,806

[22] Filed: Aug. 28, 1996

[30] Foreign Application Priority Data

Aug. 28, 1995 [KR] Rep. of Korea ............ 95-26877

[51] Int. Cl.$^6$ .................................................. G11C 19/00
[52] U.S. Cl. .................................................. 377/75; 377/54
[58] Field of Search .................................. 377/54, 75

[56] References Cited

U.S. PATENT DOCUMENTS

| | | |
|---|---|---|
| 4,663,733 | 5/1987 | Getson, Jr. et al. ............ 364/900 |
| 5,623,423 | 4/1997 | Lipovski ............ 364/514.12 |
| 5,635,864 | 6/1997 | Jones ............ 327/77 |

*Primary Examiner*—Margaret Rose Wambach
*Attorney, Agent, or Firm*—Sughrue, Mion, Zinn, Macpeak & Seas, PLLC

[57] ABSTRACT

A circuit for detecting a synchronization byte when a decoder of a MPEG 2 system performs a parsing on a transport stream. The circuit includes a shift register for receiving a transport packet, 1 byte at a time whenever a clock signal is received, and for outputting the packet to a first comparing device which compares a hexadecimal value 47 (OX47) and the value received from the shift register. A logical sum device sums the signal output from the first comparing device and a reset signal. A first counter has a value of 0 or 1 according to the value output from the first comparing device whenever a clock signal is input to the first counter. A second comparing device is provided for comparing the decimal value of 188 and the value of the first counter. A logical multiplication device multiplies the value output from the first comparing device with the value output from the second comparing device. The value of a second counter is increased by the output from the logical multiplication device when the output of both the first comparing device and the second comparing device is 1. Finally, the circuit includes a third comparing device which compares the value of the second counter and the decimal value 2, and a fourth comparing device which determines a value of a synchronization byte detecting flag by comparing the output of the first comparing means and the output of the third comparing means.

5 Claims, 1 Drawing Sheet

CIRCUIT FOR DETECTING A SYNCHRONIZATION BYTE OF A TRANSPORT STREAM

BACKGROUND OF THE INVENTION

The present invention relates to a circuit for detecting a synchronization byte of a transport stream. More particularly, the present invention is directed to a circuit for detecting a synchronization byte of a transport packet at a MPEG 2 (Moving Picture Experts Group) system decoder.

In order to include many applied fields, MPEG, which is regarded as an international standard of applied technology in the field of multi media, has reduced the elements of a system to maintain a transport rate of 1 to 1.5 Mbps.

MPEG deals not only with picture compression but also with audio compression and synchronization of a picture.

MPEG video deals with compression of a picture signal of 1.5 Mbps, and MPEG audio deals with a digital audio signal having a transport rate of 64,128,192 Mbps per channel.

The MPEG system deals with multiplexing and synchronization of a plurality of compressed audio and video signals.

The rate of the picture signal cannot be over 1.5 Mbps because the access rate of present digital storage devices is limited to 1.5 Mbps.

MPEG enables precise regulation of the arithmetic capacity and processing method of a decoder while not affecting the encoder.

The display of the picture signal changes grossly according to the prediction capacity of a motion vector generated in an encoder or fixing of a value of a parameter which changes by content of display. The display does not work well with video signals of 1.5 Mbps.

When MPEG 1 appeared for the first time, the video suffered from gross display deformation, which has recently been improved.

As for MPEG 2 video, the input bit rate of the encoder is not limited to 1.5 Mbps as in MPEG 1, and estimation is set from 4 to 5 Mbps. That is, MPEG 2 video provides a better quality display. In addition, various standardized screen sizes can be used including high definition television.

SUMMARY OF THE INVENTION

The object of the present invention is to provide a circuit for detecting a synchronization byte when a decoder of a MPEG 2 system programs a parsing on transport stream.

A preferred embodiment of the present invention includes a shift register for receiving a transport packet, 1 byte at a time whenever a clock signal is input, and for outputting the transport packet into a first comparing device which compares hexadecimal value 47 (OX47) and the value received from the shift register. A logical sum device sums the signal output from the first comparing device and a reset signal. The circuit further includes a first counter having a value which becomes 0 or 1 according to the value of the first comparing device whenever a clock signal is input, and a second comparing device which compares the decimal value 188 and the value of the first counter. A logical multiplication device is provided which performs logical multiplication of the value output from the first comparing device with the value output from the second comparing device, and the value of a second counter is increased by the output of the logical multiplication device if the output of both the first comparing device and the second comparing device is 1. A third comparing device compares the value of the second counter and decimal value 2, and a fourth comparing device determines a value of a synchronization byte detecting flag by comparing the output of the first comparing device and the output of the third comparing device.

DETAILED DESCRIPTION OF THE PREFERRED EMBODIMENT

Figure 1:
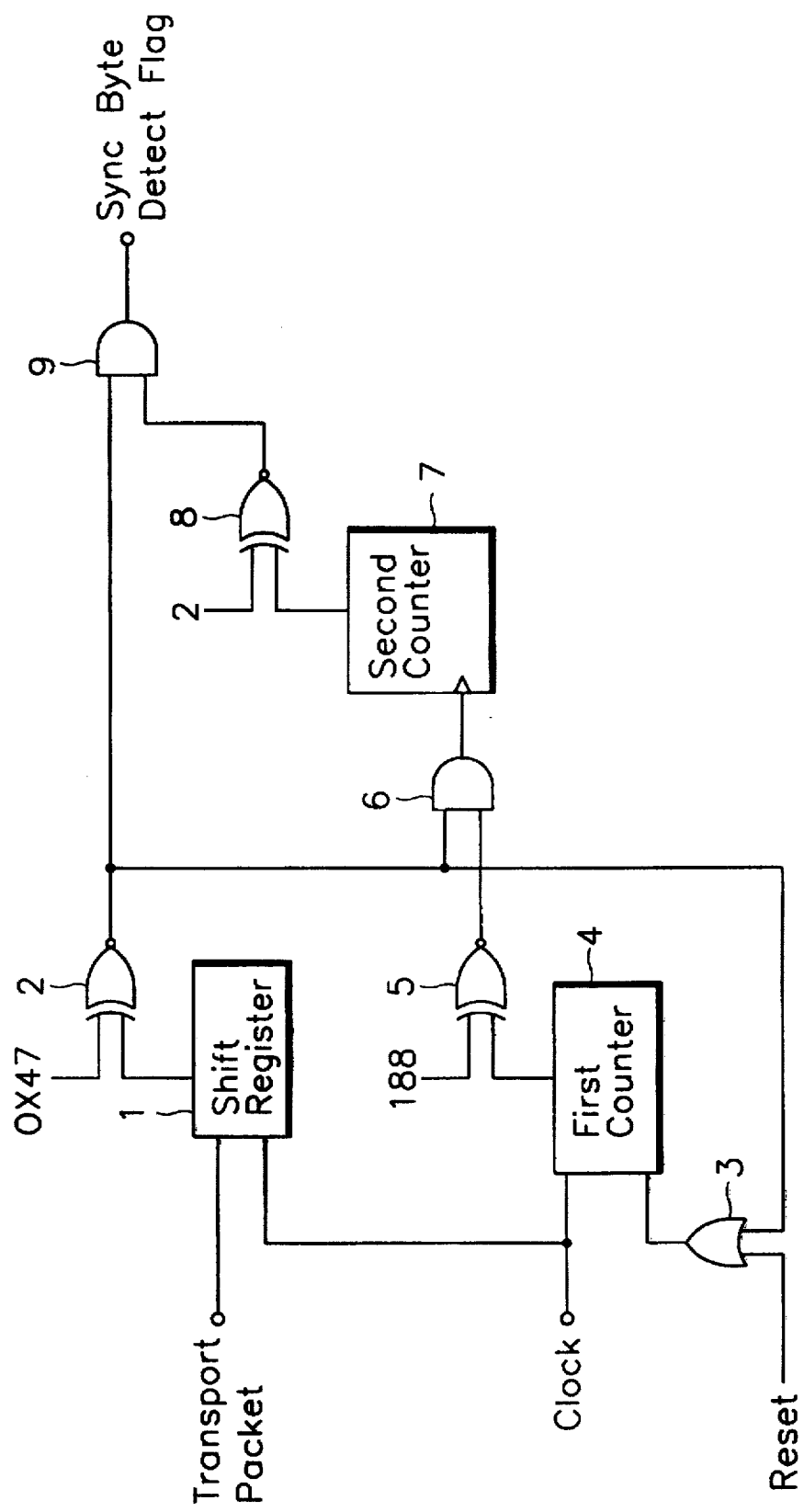
FIG. 1 is a circuit diagram of a circuit for detecting a synchronization byte of a transport stream in accordance with a preferred embodiment of the present invention.

A preferred embodiment of the present invention will become apparent from a study of the following detailed description, when viewed in light of the accompanying drawing.

FIG. 1 is a circuit diagram of a circuit for detecting a synchronization byte of a transport stream in accordance with a preferred embodiment of the present invention.

As shown in FIG. 1, the circuit for detecting a synchronization byte of a transport stream includes a shift register 1 for receiving a transport packet, 1 byte at a time, whenever a clock signal is input to the shift register 1. A first XNOR gate 2 compares a hexadecimal value 47 (OX47) and the value received from the shift register 1. An OR gate 3 performs a logical sum of the signal output from the first XNOR gate 2 and a reset signal, and determines the value of a first counter 4. The value of the first counter 4, whenever a clock signal is input, is 0 or 1 depending upon the value of the first XNOR gate 2. A second XNOR gate 5 compares a decimal value 188 with the value of the first counter 4. In addition, a first AND gate 6 performs logical multiplication of the values output from the first XNOR gate 2 and the second XNOR gate 5 and supplies the output to a second counter 7. The value of the second counter 7 is increased by the output of the first AND gate 6 if the output of both the first XNOR gate 2 and the second XNOR gate 5 is 1. A third XNOR gate 8 compares the value of the second counter 7 and a decimal value 2, and a second AND gate 9 determines the value of a synchronization byte detecting flag by comparing the output of the first XNOR gate 2 and the output of the third XNOR gate 8.

The operation of the circuit according to the present invention will now be described.

The transport stream of the MPEG 2 system includes a series of transport packets of 188 bytes where the first byte of a transport packet consists of a synchronization byte.

In order to analyze a transport stream when a stream is turned on, a synchronization byte of a transport packet must be known.

When the reset signal is active, the value of the first counter 4 and the second counter 7 becomes 0.

Whenever a clock signal is input, a transport packet is transmitted to the shift register 1 one byte at a time.

The first XNOR gate 2 receives and compares the value of the shift register 1 and hexadecimal 47 (OX47). If they are equal, the value of the first counter 4 becomes '00000000'. If the values are not equal, the value of the first counter 4 increases one by one.

When the value of the first counter 4 increases to 188, the second XNOR gate 5 outputs a logic 1.

When the output of the second XNOR gate 5 and the output of the first XNOR gate 2 are both logic 1, it is determined that a synchronization byte has been detected after passing by the 188th byte from the first synchronization byte. The value of the second counter 7 is then increased.

When the value of the second counter 7 increases to a decimal value of 2, a third XNOR gate 8 outputs a logic 1.

When the third XNOR gate 8 outputs a logic 1 and, simultaneously, the first XNOR gate 2 outputs logic 1, the second AND gate 9 sets the synchronization byte flag to 1 to analyze a transport stream.

Analyzing the transport stream includes finding a hexadecimal value 47 (OX47) which is a second 188 bytes away from the hexadecimal value 47. Since it is not clear that a value which is the first 188 bytes away from the hexadecimal value 47 (OX47) is the correct synchronization byte, detecting the value which is a second 188 bytes away from the hexadecimal value 47 reduces the possibility of error.

In accordance with a preferred embodiment, the present invention aims to provide a circuit for detecting a synchronization byte of a transport stream when a decoder of a MPEG 2 system performs a parsing on a transport stream.

The function of the present invention can be utilized in ISDN and LAN which belong to the applied field of MPEG.

What is claimed is:

1. A circuit for detecting a synchronization byte of a transport stream, comprising:

a shift register for receiving a transport packet, 1 byte at a time whenever a clock signal is received by said shift register, and for outputting said transport packet;

first comparison means for comparing a hexadecimal value 47 (OX47) and a value of said transport packet received from said shift register;

logical sum means for logically summing an output signal from said first comparing means and a reset signal;

a first counter having a value which becomes one of 0 and 1 according to a value of said output signal from said first comparing means, whenever said clock signal is received by said first counter;

second comparing means for comparing a decimal value of 188 and said value of said first counter;

logical multiplication means for logically multiplying said output signal from said first comparing means with an output signal from said second comparing means;

a second counter having a value which is increased by an output of said logical multiplication means when outputs of both said first comparing means and said second comparing means are 1;

third comparing means for comparing said value of said second counter and a decimal value 2; and fourth comparing means for determining a value of a synchronization byte detecting flag by comparing said output signal of said first comparing means and an output of said third comparing means.

2. The circuit as defined in claim 1, wherein said first comparing means, said second comparing means and said third comparing means each comprise an XNOR gate.

3. The circuit as defined in claim 1, wherein said fourth comparing means comprises an AND gate.

4. The circuit as defined in claim 1, wherein said logical sum means comprises an OR gate.

5. The circuit as defined in claim 1, wherein said logical multiplication means comprises an AND gate.

* * * * *